United States Patent [19]
Imoto et al.

[11] Patent Number: 5,134,672
[45] Date of Patent: Jul. 28, 1992

[54] OPTICAL WAVEGUIDE TYPE STAR COUPLER

[75] Inventors: Katsuyuki Imoto, Saitama; Masataka Nakazawa; Yasuo Kimura, both of Ibaraki, all of Japan

[73] Assignees: Hitachi Cable, Ltd.; Nippon Telegraph & Telephone Corporation, both of Tokyo, Japan

[21] Appl. No.: 509,972

[22] Filed: Apr. 16, 1990

[30] Foreign Application Priority Data

Apr. 19, 1989 [JP] Japan .................. 1-99238

[51] Int. Cl.⁵ .......................... G02B 6/00; G02B 6/36
[52] U.S. Cl. .......................... 385/16; 385/44; 385/45
[58] Field of Search .............. 350/96.12, 96.13, 96.14, 350/96.16, 96.34

[56] References Cited

U.S. PATENT DOCUMENTS

| | | | |
|---|---|---|---|
| 4,515,428 | 5/1985 | Findakly | 350/96.16 |
| 4,652,076 | 3/1987 | Unger | 350/96.13 X |
| 4,723,824 | 2/1988 | Shaw et al. | 350/96.15 |
| 4,787,692 | 11/1988 | Spanke | 350/96.16 |
| 4,826,288 | 5/1989 | Mansfield et al. | 350/96.34 X |

FOREIGN PATENT DOCUMENTS 0283301  9/1988  European Pat. Off.
1550655  9/1979  United Kingdom.

OTHER PUBLICATIONS

"Optical Integrated Circuits", published Feb. 25, 1985, Ohm-sha, Tokyo, Japan.

Primary Examiner—Akm E. Ullah
Attorney, Agent, or Firm—Helfgott & Karas

[57] ABSTRACT

An optical waveguide star coupler includes a light propagating core provided on a substrate. An exciting light and a signal light are supplied to the light propagating core. The light propagating core includes a plurality of Y-branching waveguides connected one after another to provide a multi-stage waveguide structure. A signal light inputted in the core is combined during the propagation through the core with the exciting light so that the signal light is amplified.

4 Claims, 5 Drawing Sheets

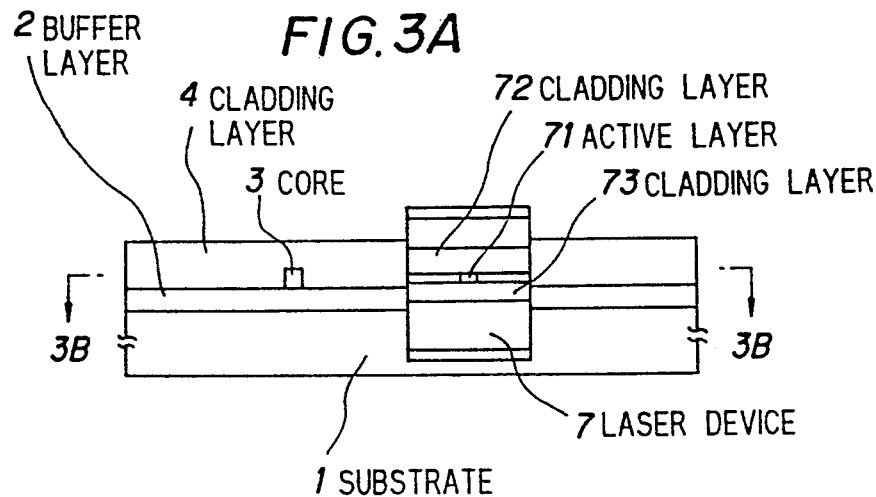
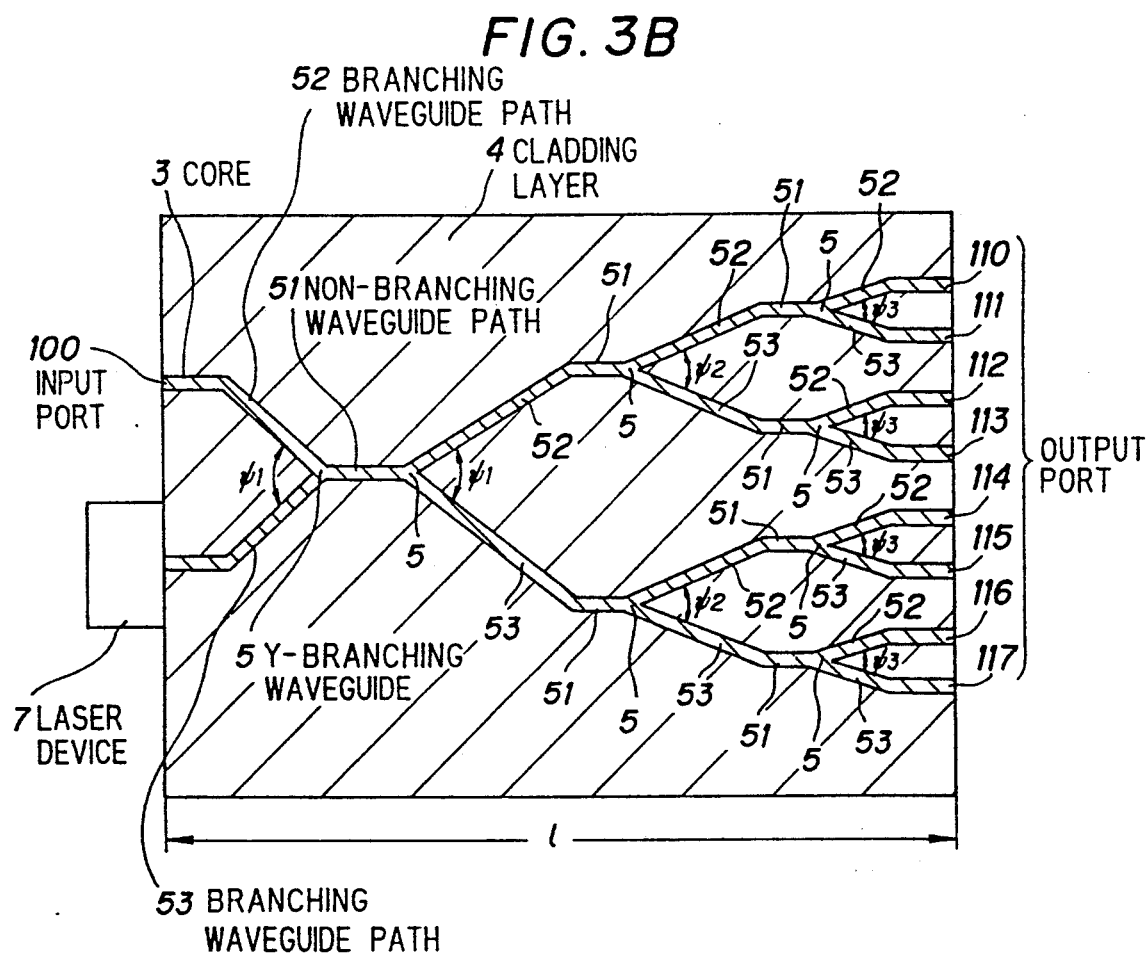

OPTICAL WAVEGUIDE TYPE STAR COUPLER

FIELD OF THE INVENTION

This invention relates to an optical waveguide type star coupler, and more particularly to a waveguide type of an optical star coupler having functions of dividing a light signal into plural light signals, and amplifying the light signals.

BACKGROUND OF THE INVENTION

An optical star coupler is one of important and indispensable optical devices in an optical fiber communication system, a light signal processing system, an optical measurement apparatus, an optical sensor, and the like, and has functions of dividing a light signal propagated through a light transmission path into N light signals (N is an integer equal to or greater than two) to be supplied to N light transmission paths, and combining N light signals propagated through N light transmission paths to provide a combined light signal to be supplied to a light transmission path. Among plural kinds of optical star couplers, a waveguide type of an optical star coupler is highly applicable to the above use, because it has advantages in mass-productivity, high reliability, economical feature, etc.

One type of a conventional optical waveguide type star coupler comprises plural Y-branching waveguides, each having one non-branching waveguide path and two divided waveguide paths, which are connected one after another, such that two divided waveguide paths of a Y-branching waveguide are connected to respective non-branching waveguide paths of two Y-branching waveguides which are positioned at a following stage to provide a multi-stage structure having one input/output port on one side and N output/input ports on the other side.

Another type of a conventional optical waveguide type star coupler comprises plural directional couplers which are also connected in the same manner. Such an optical star coupler is described in "Optical integrated circuits" published on Feb. 25, 1985 from Ohm-sha, Tokyo, Japan by Nishihara et. al. These conventional optical waveguide type star couplers will be explained in more detail later.

In a case where the optical waveguide type star coupler is used for an optical divider, an input light signal is supplied to the input port. Thus, the input light signal is sequentially divided into two light signals in each of the plural Y-branching waveguides which are connected to provide the multi-stage structure, so that N output light signals are obtained at the N output port.

However, the former conventional optical waveguide type star coupler has a disadvantage that a branching angle of each Y-branching waveguide which is required is less than three degrees to suppress a scattering loss of light. As a result, the entire length becomes large, thereby increasing an absorption loss of light in waveguide paths. In addition, the optical star coupler has an extremely elongated configuration, as the number N of the output ports is increased, so that a uniform distribution characteristic is difficult to be realized in view of fabricating processes such as a glass film formation process, a photolithography process, a dry-etching process, etc., although it has the advantage that a wavelength dependency of a branching ratio is small to provide a wide band characteristic.

The latter conventional optical waveguide type star coupler has also the disadvantage that a band is narrow and has a range of 50 to 100 Å as compared to the former optical star coupler, and a branching ratio is largely changed by a structure and dimension deviation of a coupling portion of the directional coupler. In addition, a required branching angle of the directional coupler is also less than three degrees. As a result, the same disadvantage is resulted as explained in the former optical star coupler.

SUMMARY OF THE INVENTION

Accordingly, it is an object of this invention to provide an optical waveguide type star coupler in which a branching angle of an optical divider can be increased by amplifying a light signal.

It is a further object of this invention to provide an optical waveguide type star coupler, the entire length of which is shortened.

It is a still further object of this invention to provide an optical waveguide type star coupler in which an extremely elongated configuration is avoided.

It is yet still a further object of this invention to provide an optical waveguide type star coupler in which a uniform distribution characteristic is obtained.

It is an additional object of this invention to provide an optical waveguide type star coupler having a wide band characteristic.

According to this invention, an optical waveguide type star coupler comprises:

a light propagating core provided on a substrate, the light propagating core including a multi-stage structure having plural Y-branching waveguides which are connected to provide a such that one of the Y-branching waveguides is connected at a non-divided waveguide path to one of two branching waveguide paths of a Y-branching waveguide at a preceding stage, and at two branching waveguide paths to respective non-branching waveguide paths of two Y-branching waveguides at a following stage;

at least one first input port to which a signal light is supplied, the first input port being connected to the non-branching waveguide path of the Y-branching waveguide at a first stage of the multi-stage structure;

at least one second input port to which an exciting light is supplied, the second input port being connected to the non-branching waveguide path of the Y-branching waveguide at the first stage; and plural output ports from which divided signal lights are supplied to a following stage, the plural output ports being connected to corresponding branching waveguide paths of the Y-branching waveguides at a final stage of the multi-stage structure;

wherein the signal light is combined with the exciting light during propagation through the light propagating core, whereby the signal light to be supplied from the plural output ports is amplified.

BRIEF DESCRIPTION OF THE DRAWINGS

This invention will be explained in more detail in conjunction with appended drawings, wherein:

FIGS. 3B, 4B and 5B are cross-sectional views cut along lines 3B—3B, 4B—4B, and 5B—5B in FIGS. 3A, 4A, and 5A, respectively.

DESCRIPTION OF THE PREFERRED EMBODIMENTS

Figure 1A:
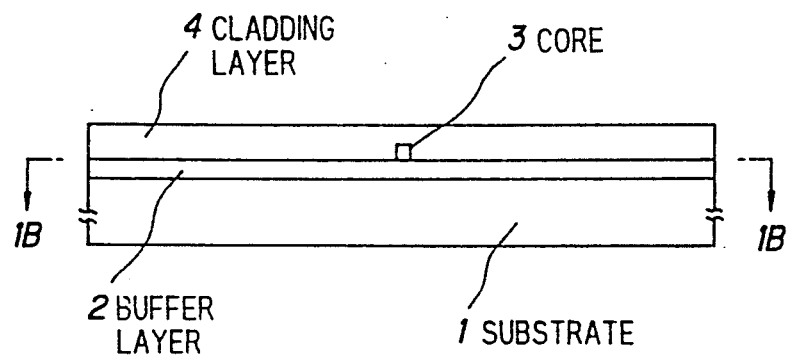
FIG. 1A is a front view showing a conventional optical waveguide type star coupler.
Figure 1B:
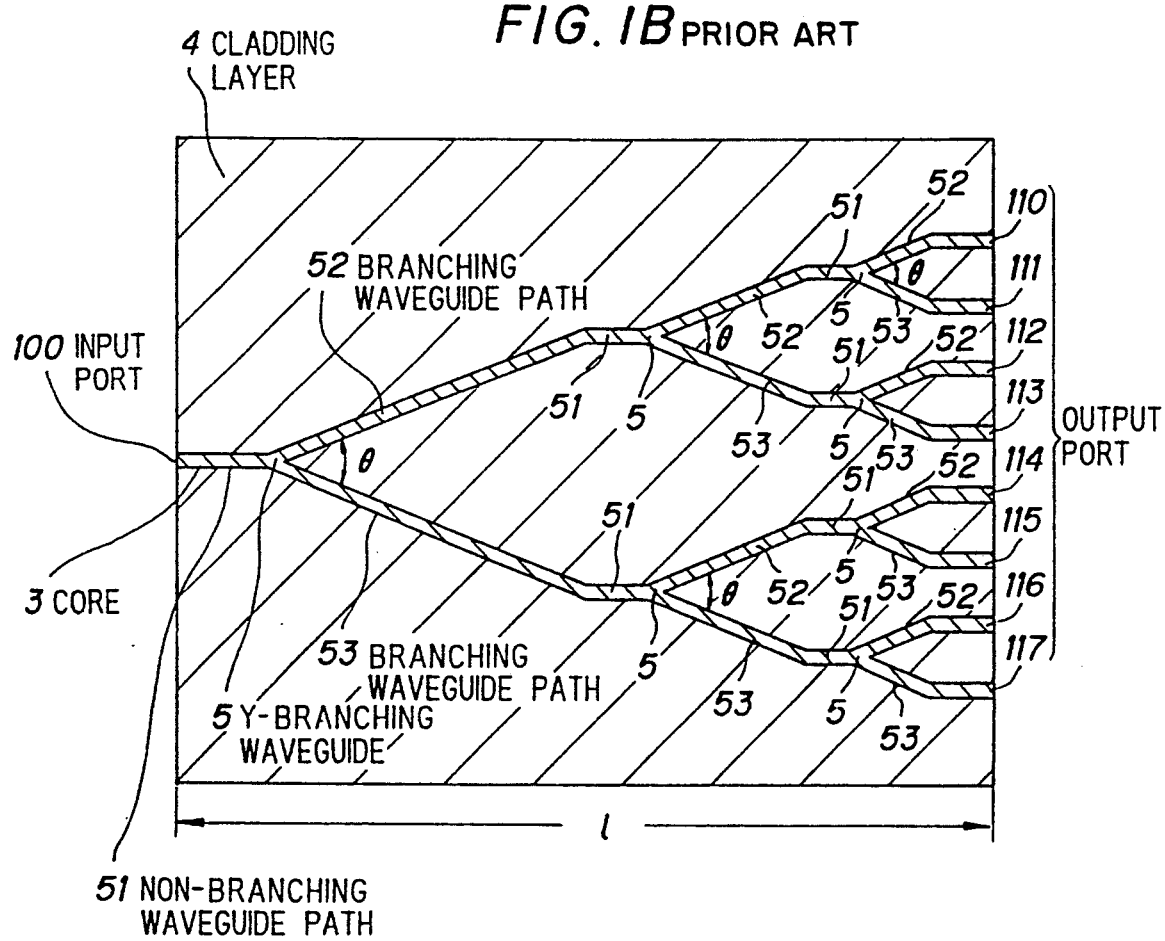
FIG. 1B is a cross-sectional view cut along a line 1B—1B in FIG. 1A.

Before explaining an optical waveguide type star coupler in the first embodiment according to the invention, the aforementioned former conventional optical waveguide type star coupler will be explained in connection with FIGS. 1A and 1B. In FIG. 1A, the optical star coupler comprises a substrate 1 of Si or $SiO_2$, a buffer layer 2 of $SiO_2$ or $SiO_2$ including a refractive index controlling material, a core 3 for a light waveguide path composed of $SiO_2$ system glass of a high refractive index material including at least one refractive index controlling material selected from Ti, Ge, P, B, Al, Na, K, etc., and a cladding layer 4 of a low refractive index material such as $SiO_2$ or $SiO_2$ including a refractive index controlling material. In FIG. 1B, the core 3 includes first to seventh Y-branching waveguides 5, each of which has one non-branching waveguide path 51, and two branching waveguide paths 52 and 53 having a branching angle $\theta$, which are connected such that a non-branching waveguide path 51 is connected to one of two branching waveguide paths 52 and 53 of a preceding Y-branching waveguide 5, and two branching waveguide paths 52 and 53 are connected to respective non-branching waveguide paths 51 of two Y-branching waveguides 5 of a following stage. In accordance with this connecting structure, the optical star coupler is provided with one input port 100, and eight output ports 110 to 117.

Figure 2A:
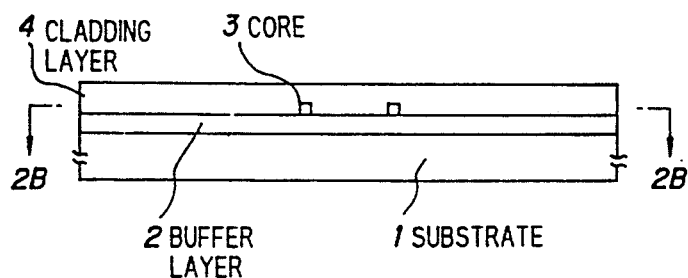
FIG. 2A is a front view showing another conventional optical waveguide type star coupler.
Figure 2B:
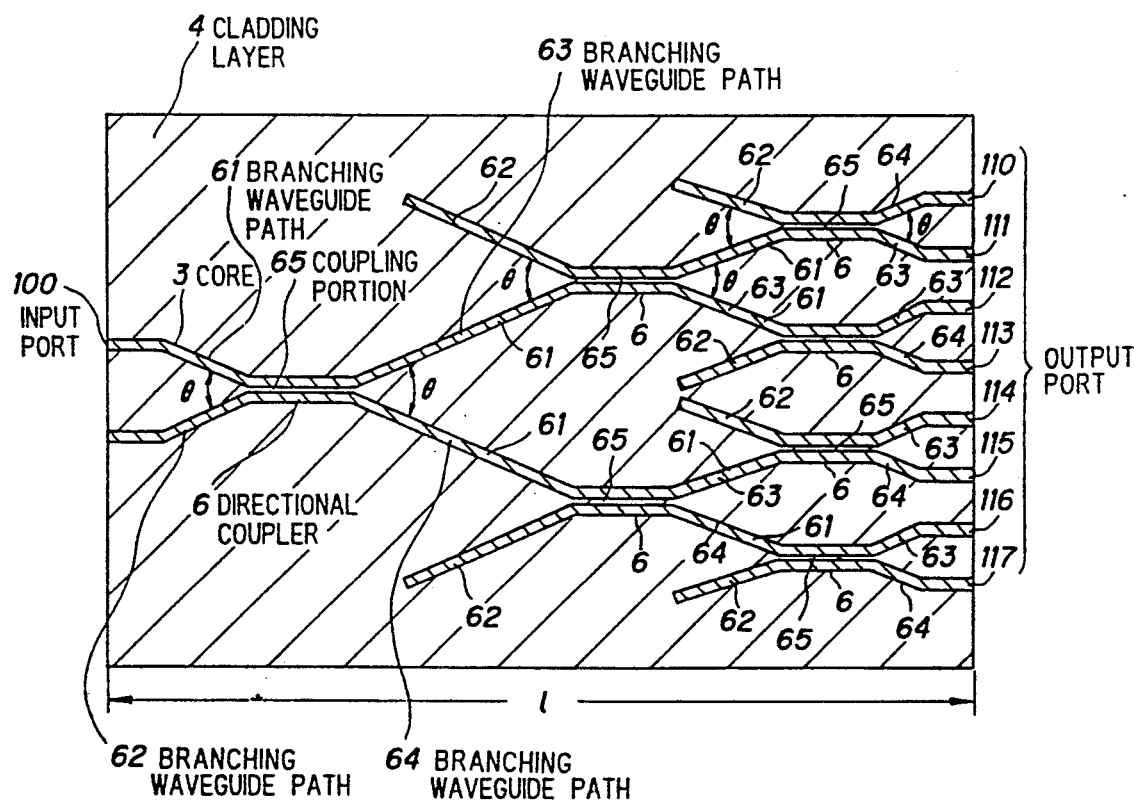
FIG. 2B is a cross-sectional view cut along a line 2B—2B in FIG. 2A, FIGS. 3A, 4A, and 5A are front views showing optical waveguide type star couplers of first to third preferred embodiments according to the invention.

The aforementioned latter optical waveguide type star coupler is shown in FIGS. 2A and 2B, wherein like parts are indicated by like reference numerals as used in FIGS. 1A and 1B, except that the first to seventh Y-branching waveguides 5 are replaced by the first to seventh directional couplers 6, each of which has two branching waveguide paths 61 and 62, and 63 and 64 on each of both sides of a coupling portion 65, provided that one branching wavelength path 62 is not used on one side of the coupling portion 65.

In each of the former and latter conventional optical waveguide type star couplers, optical fibers (not shown) are connected to the input port 100, and the output ports 110 to 117. For the purpose of connecting the optical fibers to the output ports 110 to 117, an interval between neighboring output ports is required to be at least 250 $\mu m$ between the output ports 110 to 117. Therefore, the entire length l of the optical star couplers becomes large, in addition to the reason, as described before, why the branching angle $\theta$ is less than three degrees to suppress a scattering loss of light.

Next, an optical waveguide type star coupler in the first preferred embodiment according to the invention will be explained in FIGS. 3A and 3B, wherein like ports are indicated by like reference numerals as used in FIGS. 1A and 1B.

In the optical waveguide type star coupler, a buffer layer 2 of a low refractive index Nb is provided on a substrate 1, and a core 3 of a refractive index Nw greater than the refractive index Nb (Nw>Nb) which is composed of $SiO_2$ system glass including, for instance, at least one rare earth element selected from the group comprising Er, Nd, Yb, Ce, Ho, Tm, etc. and at least one refractive index controlling material selected from the group comprising Ti, Ge, P, B, Al, Na, K, etc. On the buffer layer 2, a cladding layer 4 of a refractive index Nc lower than the refractive index Nw (Nc<Nw) is provided to cover the core 3 which provides a light propagating path. The core 3 includes first to eighth Y-branching waveguides 5 which are connected to provide a connecting pattern as shown in FIG. 3B. Each of the Y-branching waveguides 5 has one non-branching waveguide path 51 and two branching waveguide paths 52 and 53 having a branching angle therebetween selected from $\psi_1$, $\psi_2$, and $\psi_3$. The first Y-branching waveguides 5 having the branching angle $\psi_1$ is positioned to be connected to an input port 100 by the branching waveguide path 52, and to a semiconductor laser device 7 by the branching waveguide path 53. The laser device 7 comprises an active layer 71, cladding layers 72 and 73, etc. and is not explained in detail here, because it may be of an ordinary type. In addition, the non-branching waveguide path 51 of the first Y-branching waveguide 5 is connected to the non-branching waveguide path 51 of the second Y-branching waveguide 5 also having the branching angle $\psi_1$, and the second to eight Y-branching waveguides 5 are connected one after another, such that one of the Y-branching waveguides 5 is connected to one of the branching waveguide paths 52 and 53 of a preceding Y-branching waveguide path by the non-branching waveguide path 51, and to the non-branching waveguide paths 51 of following two Y-branching waveguides 5 by the branching waveguide paths 52 and 53. Thus, first to eighth output ports 110 to 117 are provided by the fifth to eighth Y-branching waveguides 5 each having the branching angle $\psi_3$.

In operation, s signal light having a wavelength, for instance, of 1.5 $\mu m$ band is supplied to the input port 100, while the semiconductor laser device 7 is driven to emit an exciting light which will be supplied to the branching waveguide path 53 of the first Y-branching waveguide 5 so that the signal light is combined with the exciting light by the first Y-branching waveguide 5. The combined light is propagated through the second to eight Y-branching waveguides 5 to be supplied from the output ports 110 to 117 to a following stage. As described before, for instance, in a case where Er is included in the core 3, an inverted distribution occurs in a transition level of $^4I_{13/2}$-$^4I_{15/2}$ in accordance with the combining of the exciting light so that the signal light is amplified by an induced emission of the signal light. For this purpose, for instance a semiconductor layer of 1.48 $\mu m$ band wavelength, or an Ar ion laser of 514.5 nm wavelength may be used for the laser device 7 for emitting the exciting light. Consequently, absorption loss, scattering loss, branching loss, etc. which are resulted from the propagation of light through the first to eighth Y-branching waveguides 5 are compensated by this amplification of light. Therefore, the branching angles $\psi_1$, $\psi_2$ and $\psi_3$ can be large as compared to the angle in the conventional optical star coupler to shorten the entire length l of the coupler. To be more concrete, the branching angles $\psi_1$, $\psi_2$ and $\psi_3$ can be more than four degrees, so that the number of output ports can be, for instance, 16, 32, 64, or more by increasing the amount of a rare earth element included in the core 3 to increase the intensity of the exciting light. In other words, even if output ports are increased in number which would result in the increase of the entire length l, this is advantageous according to the invention, because the amplified gain is increased proportionally to the entire length l.

Here, the comparison will be discussed in regard to absorption loss $\alpha a$, scattering loss $\alpha s$, and branching loss $\alpha d$ between the invention and the conventional optical star coupler.

An intensity of output signal lights will be obtained in the conventional one by the equation (1).

$$\sum_{n=1}^{\infty} Pn = Pi - (\alpha a + \alpha s + \alpha d) \quad (1)$$

where Pi is an intensity of the input signal light.

On the other hand, an intensity of output signal lights will be obtained in the invention by the equation (2).

$$\sum_{n=1}^{\infty} Pn = Pi - (\alpha a + \alpha s + \alpha d) + Gl \quad (2)$$

where G is a gain coefficient resulted from the addition of a rare earth element to the core 3, and l is a length between the input and output ports. The gain coefficient G depends on the doping amount of a rare earth element, an intensity of the exciting light, a spot size of a transverse mode in the core 3, the absorption loss $\alpha a$, the scattering loss $\alpha s$, etc.

Figure 4A:
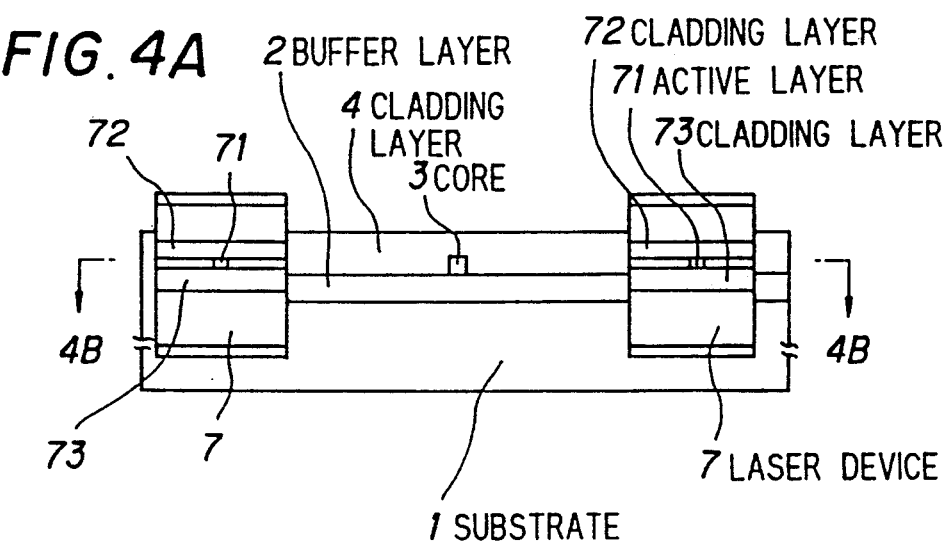
Figure 4B:
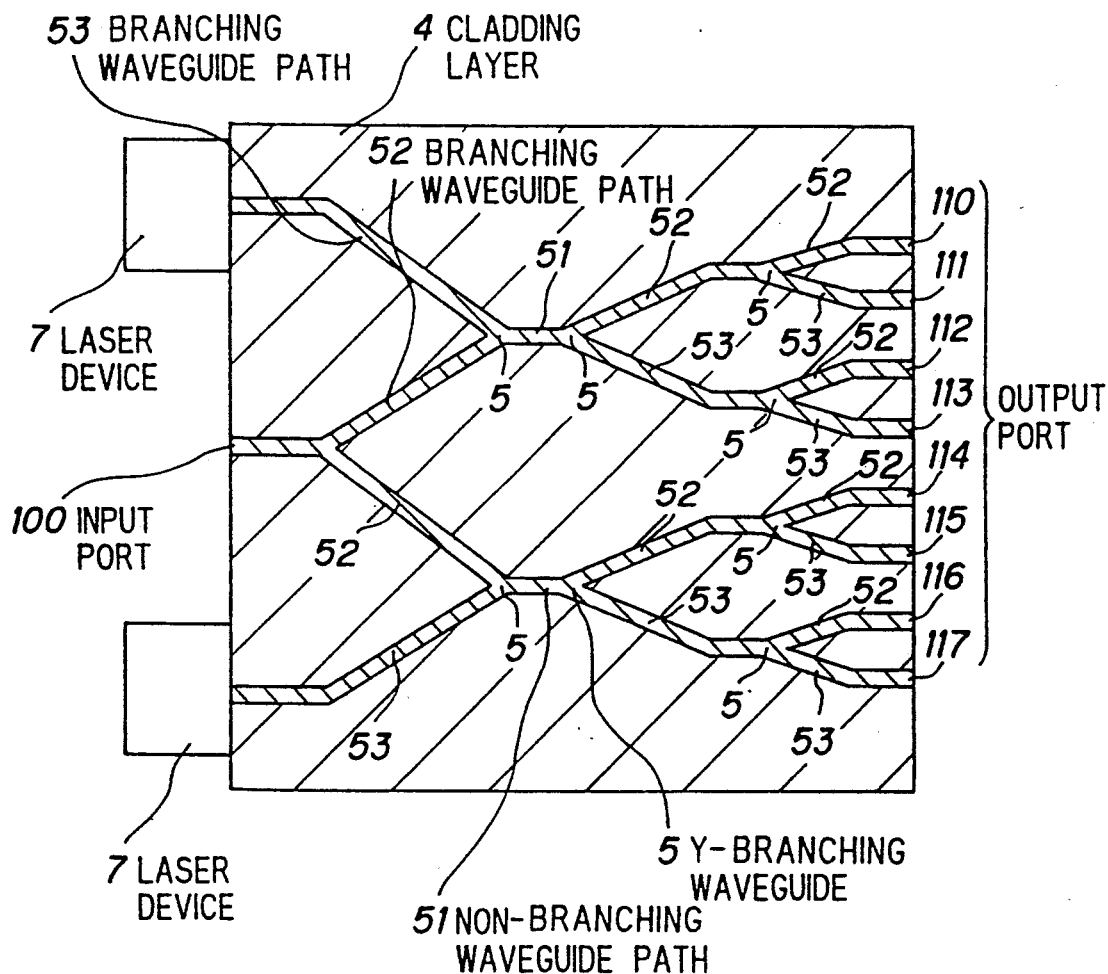

FIGS. 4A and 4B shows an optical waveguide type star coupler in accordance with a second preferred embodiment of the invention, wherein like parts are indicated by like reference numerals as used in FIGS. 3A and 3B.

In this second preferred embodiment, two laser devices 7 are provided to emit exciting lights, respectively, supplied to the branching waveguide paths 53 of the two parallel Y-branching waveguides 5, so that a gain coefficient G becomes larger.

Figure 5A:
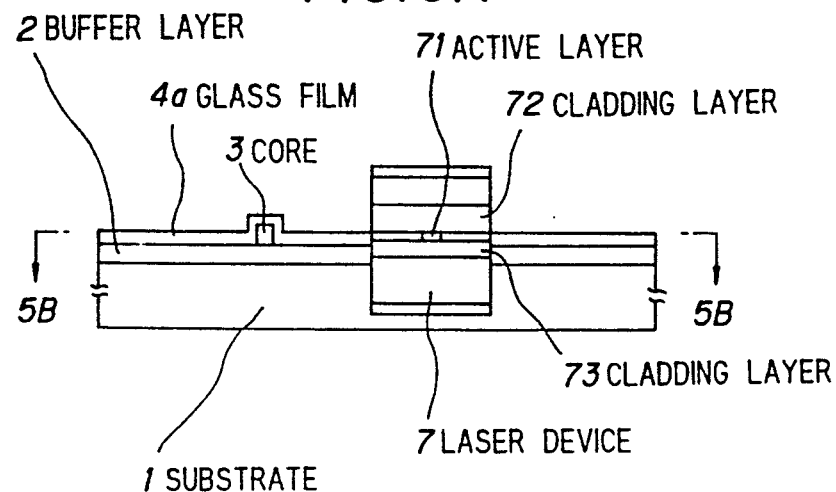
Figure 5B:
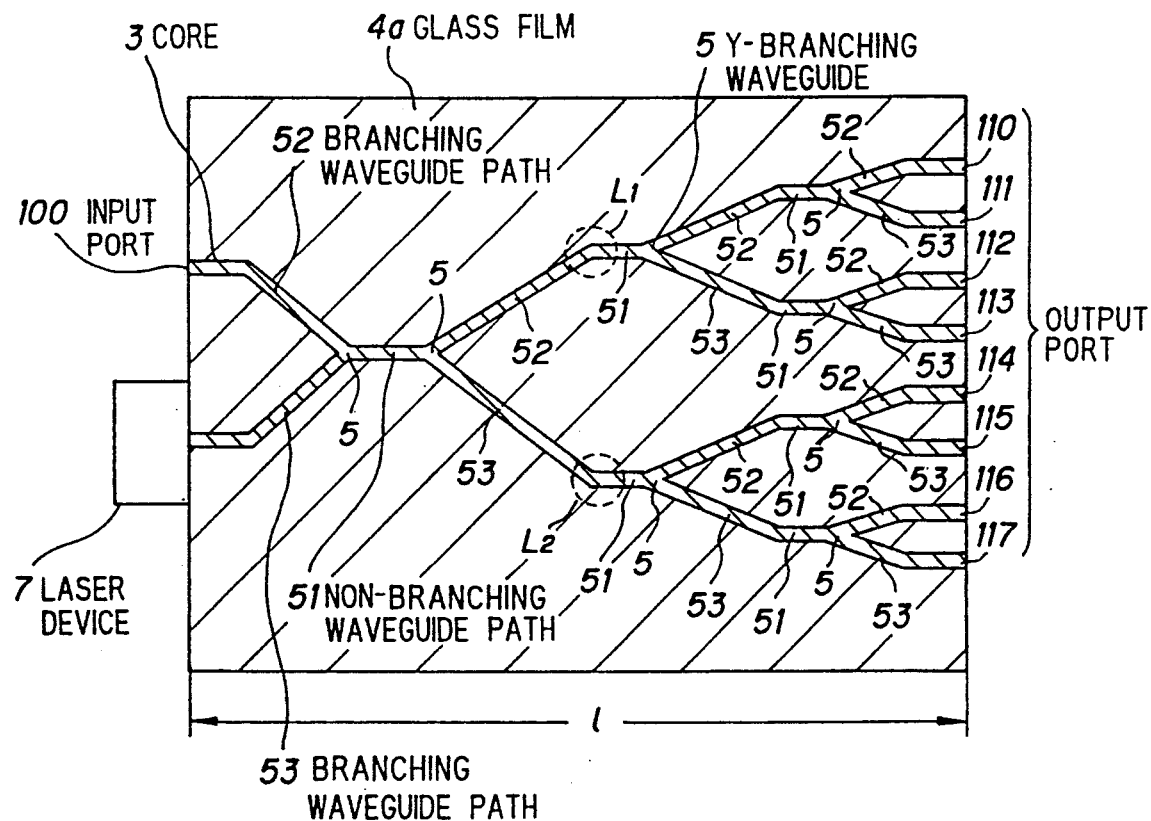

FIGS. 5A and 5B show an optical waveguide type star coupler in the third preferred embodiment according to the invention, wherein like parts are indicated by like reference numerals as used in FIGS. 3A and 3B.

In the third preferred embodiment, a waveguide structure in which a buried type of the first and second preferred embodiments is replaced by a ridge type, as clearly understood in FIG. 5A. That is, a thin glass film 4a is provided on the buffer layer 2 to cover the core 3, so that a scattering loss occuring at bending corners of waveguide paths, for instance, as shown by dotted circles $L_1$ and $L_2$ is decreased.

As described above, Y-branching waveguides which are advantageous in making an optical waveguide type star coupler smaller, and in providing a wide band characteristic for the star coupler, as compared to directional couplers, are used in the invention. Such Y-branching waveguides are structured by a core which is of glass including at least one material of a rare earth element. Thus, a signal light supplied to an input port is combined with an exciting light supplied to another input port, so that the signal light is amplified during the propagation through the Y-branching waveguides by a predetermined gain coefficient.

In the invention, the core may be a single mode waveguide or a multi-mode waveguide, and $SiO_2$ system glass including at least one of rare earth elements may be replaced by multi-component system glass including at least one refractive index controlling material selected from Ti, Ge, P, B, Al, Zn etc. In addition, the core may be of a cross-section selected from rectangle, circle, ellipse, etc., and it is not always required that a buffer layer is provided on a substrate.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical waveguide type star coupler, comprising:
    a substrate;
    a light propagating core provided on said substrate, said light propagating core including a plurality of Y-branching waveguides which are connected to each other to provide a waveguide structure with a plurality of stages of dividing signal light in a direction of elongation of the coupler, wherein one of said Y-branching waveguides is connected by a non-branching waveguide path to one of two branching waveguide paths of a Y-branching waveguide of a preceding stage of said waveguide structure and by two branching waveguide paths to respective non-branching waveguide paths of two Y-branching waveguides of a following stage of said waveguide structure;
    a signal light input port to which a signal light is supplied, said signal light input port being connected to a non-branching waveguide path of the Y-branching waveguide of a first stage of said waveguide structure;
    at least one exciting light input port to which an exciting light is supplied, said exciting light input port being connected to said non-branching waveguide path of said Y-branching waveguide of said first stage where the signal light is combined with the exciting light; and
    a plurality of output ports connected to corresponding branching waveguide paths of said Y-branching waveguides of a last stage of said waveguide structure and providing a plurality of equally divided output signal lights;
    wherein said signal light combined with said exciting light during propagation through said light propagating core is amplified and outputted from said output ports.

2. An optical waveguide type star coupler, according to claim 1, wherein:
    said light propagating core is made of glass selected from $SiO_2$ and $SiO_2$ and including at least one material selected from the group consisting of Ti, Ge, P, B, al, Na, and K, and at least one material selected from the group consisting of Er, Nd, Yb, Ce, Ho, and Tm.

3. An optical waveguide type star coupler, according to claim 1, wherein:
    said light propagating core is of a type selected from a buried type in which said light propagating core is buried by a cladding layer, and a ridge type in which said light propagating core is covered by a thin glass film.

4. An optical waveguide type star coupler, according to claim 1, further comprising:
    a laser device connected to said exciting light input port and emitting said exciting light.

* * * * *